(12) United States Patent
Lonsdorfer et al.

(10) Patent No.: US 9,751,290 B2
(45) Date of Patent: Sep. 5, 2017

(54) DEVICE AND METHOD FOR THE PRODUCTION OF TWO-DIMENSIONALLY ARCHED STRUCTURAL COMPONENTS FROM A FIBER COMPOSITE

(75) Inventors: Georg Lonsdorfer, Stade (DE); Remo Hinz, Stade (DE); Adrian Wachendorf, Söhre (DE); Niels Deschauer, Freiburg (DE); Adam Andrä, Freiburg (DE)

(73) Assignee: Airbus Operations GmbH (DE)

( * ) Notice: Subject to any disclaimer, the term of this patent is extended or adjusted under 35 U.S.C. 154(b) by 952 days.

(21) Appl. No.: 13/638,141

(22) PCT Filed: Mar. 28, 2011

(86) PCT No.: PCT/EP2011/054720
§ 371 (c)(1),
(2), (4) Date: Nov. 29, 2012

(87) PCT Pub. No.: WO2011/124492
PCT Pub. Date: Oct. 13, 2011

(65) Prior Publication Data
US 2013/0062002 A1    Mar. 14, 2013

Related U.S. Application Data

(60) Provisional application No. 61/318,898, filed on Mar. 30, 2010.

(30) Foreign Application Priority Data

Mar. 30, 2010    (DE) .................. 10 2010 013 479

(51) Int. Cl.
B29C 33/48    (2006.01)
B29C 70/28    (2006.01)
(Continued)

(52) U.S. Cl.
CPC ........ *B32B 38/0012* (2013.01); *B29C 31/008* (2013.01); *B29C 31/085* (2013.01);
(Continued)

(58) Field of Classification Search
USPC .................................................. 156/560, 562
See application file for complete search history.

(56) References Cited

U.S. PATENT DOCUMENTS 4,177,032 A    12/1979    Selden et al.
4,527,783 A    7/1985    Collora et al.
(Continued)

FOREIGN PATENT DOCUMENTS

CN    101232992 A    7/2008
CN    101247941 A    8/2008
(Continued)

OTHER PUBLICATIONS

U.S. Appl. No. 13/628,919, filed Sep. 27, 2012.
Chinese Office Action for Application No. 201180017981.5 dated Feb. 26, 2014.

*Primary Examiner* — William Bell

(57) ABSTRACT

A device and to a method for the production of essentially two-dimensionally arched large-area structural components from a fiber composite material, including a jig having a convex mounting surface which has longitudinally extending receiving channels for the insertion of construction components and which can be loaded with auxiliary materials, wherein the loaded jig interacts with a laminating bonding device having a corresponding shape for forming the structural component under pressure, wherein the jig includes a mounting shell that at the edge can be elastically deformed inwards, which mounting shell, by way of a plurality of actuators that are articulated to the inside, can be moved between an extended position (A) and at least one retracted position (B) in which the jig can be moved relative (Continued)

to the longitudinally extending receiving channels from the laminating bonding device without undercuts.

6 Claims, 2 Drawing Sheets

(51) Int. Cl.
    *B32B 38/00*     (2006.01)
    *B29C 31/00*     (2006.01)
    *B29C 31/08*     (2006.01)
    *B29C 70/46*     (2006.01)
    *B29L 31/30*     (2006.01)

(52) U.S. Cl.
    CPC .......... *B29C 33/485* (2013.01); *B29C 70/462* (2013.01); *B29L 2031/3082* (2013.01); *Y02T 50/433* (2013.01); *Y10T 156/1002* (2015.01); *Y10T 156/17* (2015.01)

(56) References Cited

U.S. PATENT DOCUMENTS

| | | |
|---|---|---|
| 5,217,669 A | 6/1993 | Dublinski et al. |
| 6,245,275 B1 | 6/2001 | Holsinger |
| 6,298,896 B1 | 10/2001 | Sherrill et al. |
| 8,534,605 B2 | 9/2013 | Haack |
| 2003/0205334 A1 | 11/2003 | Sherrill et al. |
| 2004/0050498 A1 | 3/2004 | Herrmann et al. |
| 2005/0127566 A1 | 6/2005 | Chotard |
| 2006/0108058 A1 | 5/2006 | Chapman et al. |
| 2008/0078876 A1 | 4/2008 | Baggette et al. |
| 2008/0251647 A1* | 10/2008 | Lorkowski et al. .......... 244/204 |
| 2008/0295755 A1 | 12/2008 | Weimer |
| 2009/0178765 A1 | 7/2009 | Joern et al. |
| 2009/0321569 A1 | 12/2009 | Schroeer et al. |
| 2010/0025532 A1 | 2/2010 | Herrmann et al. |
| 2010/0038487 A1 | 2/2010 | Kolax et al. |
| 2012/0055617 A1 | 3/2012 | Van Vuegt et al. |

FOREIGN PATENT DOCUMENTS

| | | |
|---|---|---|
| CN | 101432189 A | 5/2009 |
| CN | 101448697 A | 6/2009 |
| CN | 101631665 A | 1/2010 |
| CN | 101631716 A | 1/2010 |
| DE | 3605256 C1 | 3/1991 |
| DE | 10230270 A1 | 6/2003 |
| DE | 10331358 A1 | 2/2004 |
| DE | 102007027113 A1 | 12/2008 |
| GB | 1389212 A | 4/1975 |
| GB | 1431927 A | 4/1976 |

* cited by examiner

DEVICE AND METHOD FOR THE PRODUCTION OF TWO-DIMENSIONALLY ARCHED STRUCTURAL COMPONENTS FROM A FIBER COMPOSITE

CROSS-REFERENCE TO RELATED APPLICATIONS

The present application is a continuation of International Application No. PCT/EP2011/054720, filed Mar. 28, 2011, published in German, which claims priority from U.S. Provisional Patent Application No. 61/318,898, filed on Mar. 30, 2010, and German Patent Application No. 10 2010 013 479.1, filed on Mar. 30, 2010, the disclosures of which are incorporated herein by reference.

TECHNICAL FIELD

The present invention relates to a device and a method for the production of essentially two-dimensionally arched large-area structural components from a fiber composite material, comprising a jig having a convex mounting surface which has receiving channels for the insertion of construction components and which can be loaded with auxiliary materials, wherein the loaded jig interacts with a laminating bonding device having a corresponding shape for forming the structural component under pressure.

The field of application of the present invention predominantly relates to aircraft construction. In particular, wide-bodied commercial aircraft or transport aircraft can be constructed in a shell construction, in particular a semi-shell construction. In aircraft construction the term "semi-shell construction" relates to the design of the fuselage, mostly in two shells. When joined, the two shells result in an almost circular or oval cross section of a fuselage segment. A plurality of fuselage segments, arranged in line, for the rear end, the middle of the fuselage, and the cockpit section, result in the entire aircraft fuselage. Increasingly, in the production of aircraft fuselages, suitable fiber composite materials such as glass-fiber-reinforced or carbon-fiber-reinforced plastics are used. In order to stiffen the fuselage so that it can take up the expected loads, the shells usually comprise stiffening members, in particular stringers and frame elements.

In the production principle of interest in the present document, the essentially two-dimensionally shaped shell-like structural component is produced in a negative adhesive mold, in a so-called laminating bonding device (LKV) in that various layers of fiber material and resin are placed in said location and are cured. In this arrangement the laminating bonding device interacts with a jig (ARV), which is used for preparing the layer design of the skin layers, apart from positioning the stringers and the like, bonded into the layer design. Lastly, the laminating bonding device defines the corresponding external contour and ensures a smooth external surface of the shell-like structural component.

BACKGROUND OF THE INVENTION

DE 103 31 358 A1 describes a device of the type described above, which device in principle comprises a laminating bonding device and a jig that corresponds to the aforesaid. The jig essentially comprises a planar basic support to which a grid of a plurality of supporting walls of different lengths is affixed in such a manner that their distal ends, by way of modular profile components attached to the aforesaid, form a convex mounting surface, wherein spaces are used for the placement of stringers and other construction components with auxiliary materials for the structural component. In this arrangement the arched mounting surface essentially corresponds to the negative shape of the interior contour of the integral structural component to be produced. In each case the gap between adjacent modular profile components is arranged underneath the position of a stringer. Following complete assembly of the structural component and of the auxiliary materials on the jig, a suitable laminating bonding device is placed onto the jig above the aforesaid in order to finally form the structural component in a precisely-fitting manner.

At the beginning of the production process at first the mounting surface of the jig is covered by a foil. The hollow space formed by the receiving channels is subjected to a vacuum in such a manner that the foil is sucked so as to rest smoothly against the mounting surface. Thereafter a roll of the foil is coupled to a roll of a vacuum skin in such a manner that the foil is rolled on, and the vacuum skin is unrolled onto the arched mounting surface and is drawn true to shape into the receiving channels of the stringers. Subsequently, stringers comprising support elements are placed into the receiving channels that are covered by the vacuum skin. Subsequently, all the skin layers comprising fiber composite materials are placed onto the exterior surface regions of the modular profiles and the stringers, which surface regions are covered by the vacuum skin. Optimized quantities of sealing compound are applied to the outermost skin layer, and subsequently a laminating bonding device that has been turned by 180° is put in place in a properly-fitting manner, which laminating bonding device compresses the all-round sealing compound in such a manner that a vacuum-tight seal between the vacuum skin and the laminating bonding device arises, and the cavities between the vacuum skin and the laminating bonding device are evacuated. When the intended process vacuum between the external skin and the laminating bonding device has been attained, the vacuum in the hollow space formed by the spaces is switched off, and access to the atmosphere is opened. Subsequently, the laminating bonding device with the structural component arranged therein after transfer from the jig is lifted, turned by 180°, and subjected to a subsequent injection process and curing process.

During separation of the laminating bonding device from the jig, as a result of the curvature of the structural component in conjunction with the stringers that extend longitudinally on the inside, so-called undercut problems occur relative to the associated receiving channels on the jig, which problems, depending on the degree of curvature of the structural component, might render demolding more difficult as a result of a positive-locking fit that constitutes a hindrance. For this reason in this state of the art it is proposed to design the receiving channels for the stringers on the side of the jig in such a manner that no undercuts to the vertical result. However, this is associated with a disadvantage in that the degree of curvature of the structural component is severely limited by the feasibility of demolding as a result of the undercut problem. As a result of the undercut problem, in conventional jigs from a certain shell curvature onwards, the skin, which after transfer of the stringers onto a skin situated in the laminating bonding device, can no longer be moved from the laminating bonding device without in this process colliding with the stringers.

In order to solve this problem it has already been attempted to design parts of the modular profiles that form the arched mounting surface of the jig so that they are slidable in radial direction, and in this way, by moving-in the modular profiles situated in the undercut region, overcoming the undercuts that are present in that location. However, this technical solution involves considerable expense in implementing the mobility of the respective individual modular profiles of the arched mounting surface, which profiles are usually in the edge region of the aforesaid.

An aspect of the present invention relates to a device for the production of structural components that are essentially two-dimensionally arched over a large surface, which device with the use of simple technical means allows efficient automation.

BRIEF SUMMARY OF THE INVENTION

The invention encompasses the technical teaching according to which the jig comprises a continuous mounting shell that predominantly at the edge is elastically inwards deformable, which mounting shell by way of a plurality of actuators connected on the inside is movable between an extended position A and at least one retracted position B in which the jig can be moved relative to the longitudinally-extending receiving channels from the laminating bonding device without undercuts. In other words the jig according to an embodiment of the invention is able, as a result of flexible deformation of its arched mounting surface, to solve the undercut problem, in particular in terms of stringer integration in the structural component, with essentially two-dimensionally-arched shells. Apart from being loaded with stringers, the jig can also be loaded with other construction components, for example window frames, door frames and the like. Among other things separating foils, vacuum foils and bleeder fabric can be used as auxiliary materials.

The solution according to an aspect of the invention is advantageous, in particular, in that the deformable mounting shell can be produced from a single panel-like part and, because of the material elasticity, can be elastically deformed in such a suitable manner that separation of the jig from the laminating bonding device is possible without undercuts. As a result of such a deformable mounting shell it is also possible to reduce the overall weight of the jig. Furthermore, the actuators provided for moving the mounting shell between the two positions comprise a simple mechanism. For the purpose of storage and transport, the external geometric dimensions of the jig can be reduced in that the mounting shell is moved to the retracted position B.

Preferably, the actuators articulated on the inside at the mounting shell are arranged so as to be spaced apart from each other along both opposite edge regions of the mounting shell. This particularly simple mechanism is sufficient to move between the extended position A and the retracted position B. In addition, the actuators are preferably aligned radially inwards in the longitudinal extension, and are articulated on the inside to a stationary supporting structure. As a result of this the jig is particularly compact in size because there are no significant components that project beyond the geometric dimensions of the arched mounting shell. Such a supporting structure comprises a plurality of framework beams that are interconnected so as to be statically safe, according to an embodiment of the invention.

Depending on the available operating medium, the actuators are designed as double-acting pneumatic cylinders or as linear electrical drives, according to an embodiment of the invention.

According to a measure of the invention, it is proposed that the mounting shell of the jig be designed so as to be continuous and in one piece, wherein the receiving channels for the stringers are preferably formed in the single-piece mounting shell. If the mounting shell comprises a metal sheet, these shapes can be generated by bending, in other words by plastic deformation in some regions. Apart from this it is, however, also imaginable to produce the mounting shell from a fiber composite material, in other words by original shaping. The intrinsic elastic flexibility of the fiber composite material is sufficient to provide the mounting shell with the elastic deformability that is significant in the context of the invention.

Since the solution disclosed in this document is suitable in particular for the production of predominantly two-dimensionally arched structural components, by means of a mounting shell according to the invention in particular the form of a cylinder segment can be implemented in order to, for example, produce fuselage shells that extend in a straight line in longitudinal direction as structural components.

By means of the device described above, a structural component being essentially two-dimensionally arched over a large surface, which structural component comprises a fiber composite material, can preferably be produced in that:

the mounting shell of the jig, which mounting shell is in the upwards-arched initial position and can be deformed inwards, is loaded with construction components, for example in particular stringers and auxiliary materials, the loaded jig is subsequently evacuated and turned so that it assumes a downwards-arched operating position, the mounting shell of the now loaded and downwards-arched jig is deformed towards the inside and by subsequent retraction is brought together with the corresponding laminating bonding device, wherein the mounting shell of the retracted jig is again deformed towards the outside in order to initiate the stringer transfer to the laminating bonding device, after which the elastic mounting shell of the jig is again deformed inwards in order to be able to move the jig from the laminating bonding device without undercuts.

Implementation of these method-related steps is contingent on the elastic mounting shell according to an embodiment of the invention, which mounting shell on the edge is inwards deformable, and in principle forms a rigid skin with receiving channels for the stringers and other construction components as well as the auxiliary materials. With the application of forces the jig is deformed to such an extent that the mounting shell can be moved up to the shell skin situated in the laminating bonding device without colliding, according to an embodiment of the invention. Subsequently, the mounting shell deforms back to the extent necessary so that the stringers and if applicable any further construction components with auxiliary materials can be transferred to the laminating bonding device. Finally, the jig is again deformed in the inwards direction to such an extent that the mounting shell can be moved from the structural component that is arched in a shell-like manner without this resulting in a collision, in particular with the stringers.

BRIEF DESCRIPTION OF THE DRAWINGS

Below, further measures that improve the invention are presented in detail together with the description of a preferred exemplary embodiment of the device with reference to the figures. The following are shown.

DETAILED DESCRIPTION

Figure 1:
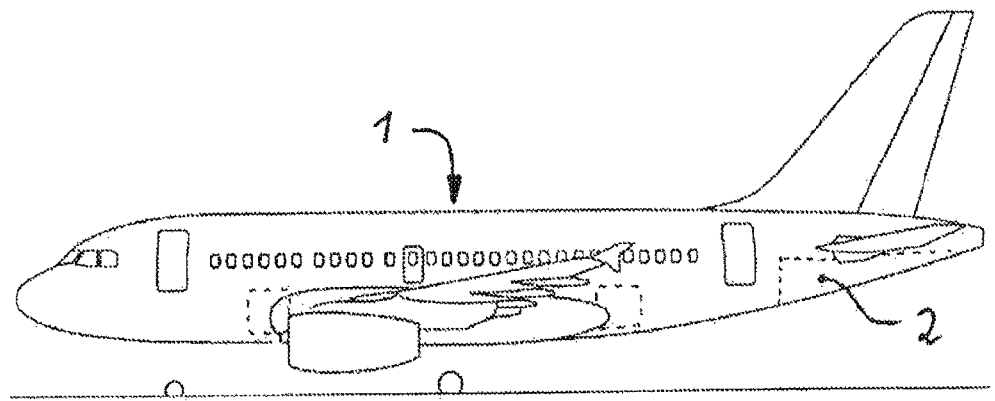
FIG. 1 a diagrammatic lateral view of an aircraft comprising a wide-body fuselage that comprises individual fuselage shells, FIG. 2 a diagrammatic view of a jig with a deformable mounting shell, FIG. 3 a first method-related step for the production of an arched structural component, FIG. 4 a second method-related step for the production of an arched structural component, FIG. 5 a third method-related step for the production of an arched structural component, and FIG. 6 a fourth method-related step for the production of an arched structural component.

According to FIG. 1 the commercial aircraft shown comprises a wide-body fuselage 1 which, produced in a shell construction, also comprises a rear fuselage shell 2, which in the diagram shown is designed as an essentially two-dimensionally arched structural component.

Figure 2:
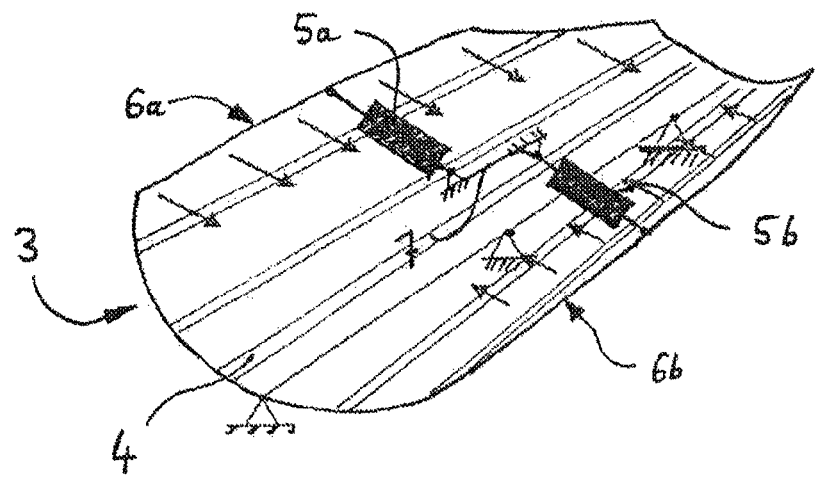

According to FIG. 2 this structural component is produced by means of a jig that comprises an outwards-arched mounting surface 3. On the outside a plurality of receiving channels 4 arranged spaced apart from each other extend over the mounting surface 3 for inserting stringers, with the aforesaid together with the fiber-reinforced auxiliary materials to be applied to the mounting surface 3 at the end of the production process forming the structural component.

As indicated by the rows of arrows, the mounting shell 3 at the edge can be elastically deformed inwards. For this purpose a plurality of actuators 5a, 5b that are articulated to the inside are provided (as an example) in order to move the mounting shell 3 from the extended position shown in the diagram to a retracted position in which interaction without undercuts with a laminating bonding device (not shown in the diagram) is possible. In order to implement effective deformation, the actuators 5a and 5b (as an example) are articulated in an in-line arrangement along both opposing edge regions 6a and 6b of the mounting shell 4. In their longitudinal extension the actuators 5a, 5b are aligned approximately radially inwards where they are attached to a stationary supporting structure 7.

In this exemplary embodiment the mounting shell 3 comprises a single-piece-arched piece of sheet metal, and the actuators 5a, 5b are pneumatic cylinders which guide the essentially cylinder-segment-shaped mounting shell 3 from the extended position shown to a radially-inwards deformed retracted position. The receiving channels 4 for the stringers and if applicable for other construction components have been formed directly into the mounting shell 3.

Figure 3:
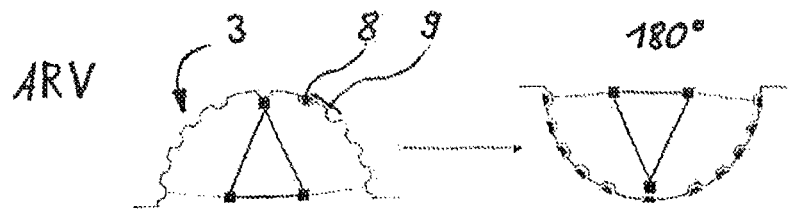

According to FIG. 3, for the production of the large-area essentially two-dimensionally arched structural component with the aid of the above-described jig, the mounting shell 3, which is in the upwards-arched initial position, with stringers 8 and auxiliary materials 9 in the form of fiber mats, is loaded. As shown in the diagram, the mounting shell 3, loaded in this manner, is then after evacuation turned over by 180° so that it attains a downwards-arched operating position. As a result of the vacuum method, which is known per se, the stringers 8 with the auxiliary materials 9 remain attached to the mounting shell 3.

Figure 4:
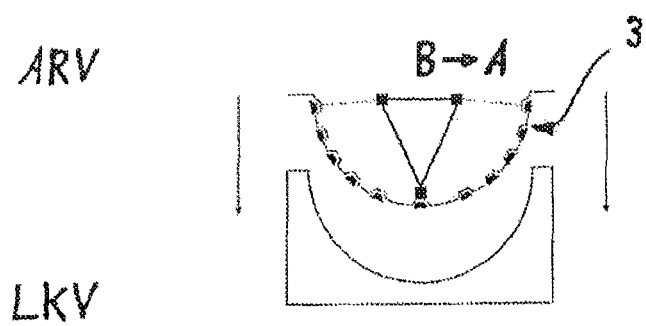

Subsequently, according to FIG. 4, the mounting shell 3 of the loaded and downwards-arched jig is deformed radially inwards into the retracted position B in order to move the aforesaid into a corresponding laminating bonding device positioned underneath this. In the retracted state the jig is transferred back to the extended position A. This is followed by the transfer of the stringers together with the auxiliary materials to the laminating bonding device. To this effect a vacuum is drawn on the side of the laminating bonding device, and ventilation takes place on the side of the jig.

Figure 5:
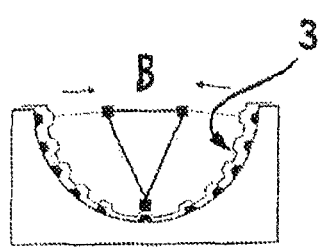
Figure 6:
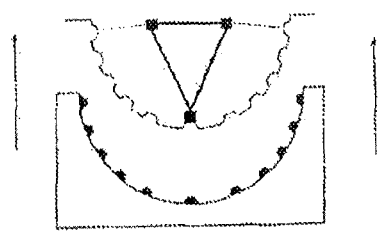

Thereafter, according to FIG. 5, the elastic mounting shell 3 of the turned jig is again deformed inwards until it attains the retracted position B, and lastly the jig is moved from the laminating bonding device without undercuts, as shown in FIG. 6.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Fuselage
2 Fuselage shell
3 Mounting shell
4 Receiving channel
5 Actuator
6 Edge region
7 Supporting structure
8 Stringer
9 Auxiliary material
ARV Jig
LKV Laminating bonding device
A Extended position of the jig
B Retracted position of the jig

The invention claimed is:

1. A device for the production of essentially two-dimensionally arched large-area structural components from a fiber composite material, comprising:
   a jig having a convex mounting surface comprising a plurality of receiving channels for the insertion of construction components and configured to be loaded with auxiliary materials,
   wherein the loaded jig is configured to interact with a laminating bonding device having a corresponding shape for forming the structural component under pressure,
   wherein the jig comprises a mounting shell configured to be elastically deformed inwards at the edge thereof, and
   a plurality of actuators articulated to the inside and configured to move the mounting shell between an extended position (A) and at least one retracted position (B),
   wherein, in the at least one retracted position, the jig is configured to be moved relative to the receiving channels from the laminating bonding device without undercuts,
   wherein the actuators are arranged spaced apart from each other along first and second opposing edge regions of the mounting shell for enabling the mounting shell to move between the extended position (A) and the at least one retracted position (B), and
   wherein the mounting shell consists of one arched metal sheet.

2. The device of claim 1, wherein the longitudinal extension of the actuators is aligned so as to point inwards, and said actuators are articulated in the interior to a stationary supporting structure.

3. The device of claim 1, wherein the actuators comprise pneumatic cylinders or linear electrical drives.

4. The device of claim 1, wherein the mounting shell is in the shape of a cylinder segment.

5. The device of claim 1, wherein the receiving channels for the stringers are formed into the mounting shell.

6. The device of claim 1, wherein the supporting structure of the mounting shell comprises a plurality of framework beams.

\* \* \* \* \*